(12) United States Patent
Mueller et al.

(10) Patent No.: US 10,202,915 B2
(45) Date of Patent: Feb. 12, 2019

(54) DIFFERENTIATING A FLOW RATE ERROR AND A DYNAMIC ERROR OF AN EXHAUST GAS RECIRCULATION SYSTEM

(71) Applicant: Robert Bosch GmbH, Stuttgart (DE)

(72) Inventors: Frank Mueller, Weil der Stadt (DE); Marcel Schaefer, Landau (DE); Richard Holberg, Stuttgart (DE); Shuwen Ling, Stuttgart (DE); Stefan Michael, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/864,303

(22) Filed: Jan. 8, 2018

(65) Prior Publication Data

US 2018/0195446 A1 Jul. 12, 2018

(30) Foreign Application Priority Data

Jan. 10, 2017 (DE) .......................... 10 2017 200 290

(51) Int. Cl.
| | |
|---|---|
| *F02D 41/00* | (2006.01) |
| *F02M 26/07* | (2016.01) |
| *F02D 41/22* | (2006.01) |
| *F02D 41/14* | (2006.01) |

(52) U.S. Cl.
CPC ..... *F02D 41/0072* (2013.01); *F02D 41/1401* (2013.01); *F02D 41/221* (2013.01); *F02M 26/07* (2016.02); *F02D 2041/1432* (2013.01); *F02D 2041/1433* (2013.01)

(58) Field of Classification Search
CPC .. F02D 41/00; F02D 41/0072; F02D 41/1401; F02D 41/221; F02D 2041/1432; F02D 2041/1433; F02M 26/07
See application file for complete search history.

(56) References Cited

U.S. PATENT DOCUMENTS 8,769,931 B2 * 7/2014 Nam ...................... F02M 26/71
60/277

FOREIGN PATENT DOCUMENTS

| DE | 102011088296 A1 | 6/2013 |
|---|---|---|
| DE | 102012201033 A1 | 7/2013 |

* cited by examiner

*Primary Examiner* — Hieu T Vo
(74) *Attorney, Agent, or Firm* — Norton Rose Fulbright US LLP; Gerard Messina

(57) ABSTRACT

A method and a computer program for recognizing and differentiating a flow rate error and a dynamic error of an exhaust gas recirculation system (EGR) of an internal combustion engine. Measured and modeled EGR mass flow signals are each subjected to bandpass filtering using time constants optimized for determining flow rate errors and bandpass filtering using time constants optimized for determining dynamic errors. The energy is determined for each of the filtered signals and an energy quotient is computed between the energies of the signals filtered for dynamic errors and the signals filtered for flow rate errors. A dynamic error and a flow rate error of the exhaust gas recirculation may be recognized and differentiated from one another on the basis of the energy quotients.

9 Claims, 3 Drawing Sheets

DIFFERENTIATING A FLOW RATE ERROR AND A DYNAMIC ERROR OF AN EXHAUST GAS RECIRCULATION SYSTEM

CROSS REFERENCE

The present application claims the benefit under 35 U.S.C. § 119 of German Patent Application No. DE 102017200290.5 filed on Jan. 10, 2017, which is expressly incorporated herein by reference in its entirety.

BACKGROUND INFORMATION

The present invention relates to a method for recognizing and differentiating a flow rate error and a dynamic error of an exhaust gas recirculation system (EGR) in the air charge system of an internal combustion engine, an EGR mass flow being measured and modeled indirectly or directly, a measured EGR mass flow signal and a modeled EGR mass flow signal correlated thereto each being compared to one another, and a high-pressure exhaust gas recirculation valve and/or a low-pressure exhaust gas recirculation valve being associated with the air charge system.

The present invention furthermore relates to a computer program product for carrying out the method.

The statutory provisions for onboard diagnosis (OBD) in motor vehicles having internal combustion engines require the recognition of emission-relevant errors in the subsystems of the air charge system. The California legislation thus requires monitoring of the exhaust gas recirculation (EGR) in diesel engines and monitoring of the boost pressure control in gasoline and diesel engines including supercharging, for example, including exhaust gas turbochargers. The European legislation requires the monitoring of the EGR in diesel engines. In the California legislation, inter alia, the recognition of emission-relevant so-called flow errors and also of slow response errors is required. In addition, there is the requirement of locating the cause of a malfunction as exactly as possible, so that defective components may be repaired or replaced.

High/low-flow errors (flow rate errors) are understood as an undesirable response of the EGR, which results in an increase of the exhaust gas emissions up to a value above predefined onboard diagnosis limiting values. A high-flow error refers, for example, to an EGR valve which incompletely closes or jams open. An EGR valve which incompletely opens or jams in the closed state may result in a low-flow error. A slow response error (dynamic error) is understood as a slowed-down response of the exhaust gas recirculation or the boost pressure to a change of the setpoint value. The relevant error scenarios are, for example, a slowed-down EGR valve, a slowed-down exhaust flap, etc.

Both high/low-flow errors and dynamic errors may result in an increase of emissions in, for example, a diesel engine. If the EGR rate is temporarily excessively low due to a low-flow error or a slow response error, it may result in an increased peak combustion temperature and therefore a rise of the nitrogen oxide emissions. A temporarily excessively high EGR rate, in contrast, may result in a reduced combustion temperature and a reduced oxygen excess and therefore in a rise of the soot particle emissions. A temporarily excessively low or excessively high boost pressure may result in disturbances of the air charge of the cylinders, so that the quantity or the time of the fuel injection or the EGR rate is no longer optimally adapted to the actual air charge, which may result in a rise of the exhaust gas emissions.

A flow error has similar effects on the EGR system and the emissions as a slow response error. The high-flow error affects the EGR system and the emissions similarly to a negative slow response error (delayed closing of the EGR valve). The low-flow error has a similar effect as a positive slow response error (delayed opening of the EGR valve) on the EGR system and the emissions.

Various methods exist for the diagnosis of subsystems of the air charge system. For example, some conventional methods monitor the intervention of the charge regulation in the event of a change of the EGR setpoint value. A strong intervention of the charge regulation indicates an undesirable or slow response of the exhaust gas recirculation. Other convention methods model the boost pressure under the assumption of an error-free system and compare the modeled value to the measured boost pressure. If a large difference between the modeled value and the measured value is recognized in the event of a change of the boost pressure setpoint value, this indicates a slow response of the boost pressure control.

A method and a device for carrying out the method for dynamic monitoring of gas sensors of an internal combustion engine are described in German Patent Application No. DE 10 2011 088 296 A1, the gas sensors having a low-pass behavior depending on geometry, measuring principle, aging, or soiling, in the event of a change of the gas state variable to be measured, a dynamic diagnosis being carried out on the basis of a comparison of a modeled signal and a measured signal, and the measured signal being an actual value of an output signal of the gas sensor and the modeled signal being a model value. It is provided that the output signal of the gas sensor is filtered using a high-pass filter and in the event of a change of the gas state variable to be measured, higher-frequency signal components are evaluated. Changes with respect to the dynamics in gas sensors may be detected and quantified using this method.

A related method, as described in German Patent Application No. DE 10 2012 201 033 A1, may be used to ascertain a dead time of gas sensors.

It is an object of the present invention to provide a method which enables a reliable and cost-effectively implemented recognition and differentiation of a flow rate error and a dynamic error of an exhaust gas recirculation (EGR) in the air charge system of an internal combustion engine.

It is furthermore an object of the present invention to provide a computer program product for carrying out the method.

SUMMARY

The present invention may achieves these objects by providing that the measured and the modeled EGR mass flow signals are each supplied to two bandpass filters having time constants adapted for the recognition of flow rate errors and for the recognition of dynamic errors in each case, an energy $E_{meas}$, $E_{mod}$ of the obtained filtered measured and modeled EGR mass flow signals is determined, an energy quotient $r_{flow}$ is formed from energy $E_{meas, flow}$ of the measured EGR mass flow signal filtered for flow rate errors and energy $E_{mod, flow}$ of the modeled EGR mass flow signal filtered for flow rate errors, an energy quotient $r_{dyn}$ is formed from energy $E_{meas, dyn}$ of the measured EGR mass flow signal filtered for dynamic errors and energy $E_{mod, dyn}$ of the modeled EGR mass flow signal filtered for dynamic errors, and a flow rate error is recognized if energy quotient $r_{flow}$ is in a predefined flow rate error range, and in that a dynamic error is recognized if energy quotient $r_{dyn}$ is in a predefined dynamic error range.

Subsystems in air charge systems of internal combustion engines have a typical low-pass behavior, which is dependent, inter alia, on the geometry of their structure. Moreover, such systems may change their response behavior due to aging or external influences. In the time range, the decreasing cut-off frequency is expressed in a greater rising time, i.e., with unchanged excitation, the signal flanks become flatter. Therefore, if a bandpass filter having a suitable high-pass filtering, for example, having a first-order high-pass filter, is connected in series to the subsystem to be monitored of the air charge system, in the event of steep changes of the EGR mass flow, it may be recognized at the output signal of the bandpass filter whether the cut-off frequency of the low-pass filter formed by the air charge system is greater or lesser than the cut-off frequency of the high-pass filter. If the subsystem reacts sluggishly as a result of aging or external influences, only minor or no higher-frequency signal components are still determined in the event of changes of the EGR mass flow. If the system has a high level of dynamics, this affects a relatively large higher-frequency signal component. Dynamic errors, such as slow response errors, may thus be detected. As has surprisingly been shown, static flow rate errors (static flow errors) may also be recognized with the aid of this frequency-based method. For this purpose, only the time constants of the bandpass filter are to be adapted. Using the presented method, a uniform monitoring principle may thus be provided for dynamic errors and static flow rate errors in the exhaust gas recirculation system of internal combustion engines. On the one hand, it has a high level of robustness in relation to disturbances, such as statistical variations or also in relation to possible offsets. On the other hand, the method is distinguished by its low level of complexity and by a minor application expenditure and resource allocation, such as computing time and storage space.

A reliable recognition and differentiation of flow rate errors and dynamic errors may be achieved in that energy quotients r are determined over a predefined number of diagnostic events and associated with energy quotient ranges, so that a flow rate error is deduced if the focal point of the distribution thus obtained of energy quotients r is in the predefined flow rate error range, and a dynamic error is deduced if the focal point of the distribution of the energy quotients is in the predefined dynamic error range. A flow rate error or a dynamic error is therefore only recognized if a corresponding error has been recognized with respect to the focal point in many successive diagnostic events. Misdiagnoses due to flawed individual measurements may thus be avoided.

An unambiguous differentiation of flow rate errors and dynamic errors may furthermore be achieved in that the flow rate error range is at comparatively lower energy quotients r and the dynamic error range is at comparatively higher energy quotients r.

In order that multiplicative errors do not corrupt the signal comparison, a scaling of the particular energy components is preferably carried out. Additive errors do not have an effect, because a high-pass filter suppresses the steady component of a signal.

According to one preferred embodiment variant of the present invention, it may be provided that to determine energy E, the associated filtered EGR mass flow signal is squared and subsequently integrated, the integration being carried out with the aid of an integration duration which is specific to signals and/or the point in time for the start of the integration of the two signals being triggered both in the event of a rising signal flank of the output signal and in the event of a falling signal flank. The robustness may thus be increased in relation to an inaccurately modeled dead time of the model signal. To ensure that the flanks of the measured signal and the modeled signal originate from the same excitation, the trigger is preferably triggered after an applicable phase having constant signals.

A direction-specific error recognition may be achieved in that the determination of energy E and the formation of energy quotients r are restricted to the positive and/or negative components of the filtered EGR mass flow signals. It may be ascertained by this measure whether a particular error occurs, for example, upon opening or upon closing of an exhaust gas recirculation valve.

The method may be used particularly advantageously in diesel engines having an exhaust gas recirculation system. To be able to monitor errors both in a high-pressure exhaust gas recirculation and a low-pressure exhaust gas recirculation, it may be provided that a low-pressure exhaust gas recirculation mass flow via the low-pressure exhaust gas recirculation valve or a high-pressure exhaust gas recirculation mass flow via the high-pressure exhaust gas recirculation valve of the internal combustion engine is monitored, the low-pressure exhaust gas circulation mass flow and/or the high-pressure exhaust gas recirculation mass flow being determined by modeling, on the one hand, and being directly measured or being computed from measured values for an air mass flow in the supply air area of the internal combustion engine, from a speed of the internal combustion engine, and/or an inlet pressure or boost pressure, on the other hand, and that the function of the low-pressure exhaust gas circulation valve and/or the high-pressure exhaust gas recirculation valve is monitored.

The error severity and therefore the effect on the emissions of the internal combustion engine may be ascertained in that energy quotient $r_{flow}$ and energy quotient $r_{dyn}$ are determined separately for two or more EGR valve position ranges of the low-pressure exhaust gas recirculation valve and/or the high-pressure exhaust gas recirculation valve, in that a flow rate error is associated with a particular EGR valve position range of the low-pressure exhaust gas recirculation valve and/or the high-pressure exhaust gas recirculation valve if energy quotient $r_{flow}$ is in a predefined flow rate error range, and a dynamic error is associated with a particular EGR valve position range if energy quotient $r_{dyn}$ is in a predefined dynamic error range. A distribution is thus preferably ascertained of when, for example, a flow rate error occurs with which EGR valve actuator activation behavior in which energy quotient range. If this is known, for example, it may be estimated how extensively an effective available EGR valve area is reduced, for example, by sooting. Such a reduction of the effective available EGR valve area results in a reduction of the EGR rate. It may be ascertained by emission tests whether such a reduction of the EGR rate results in the exceedance of onboard diagnosis emission limiting values. If this is the case, a low-flow error may be recognized on the basis of the diagnosis. It is accordingly possible to recognize a high-flow error.

The object of the present invention relating to the computer program product may be achieved by a computer program product which may be loaded directly into the internal memory of a digital computer and includes software code sections, using which the steps of the method may be carried out when the product runs on a computer, data being supplied to the computer, from which a measured and a modeled EGR mass flow signal are determinable. The computer is preferably designed as part of an engine controller, to which the required measurement data and control signals for modeling and determining the EGR mass flow signals are supplied or provided.

The present invention is explained in greater detail below on the basis of an exemplary embodiment shown in the figures.

DETAILED DESCRIPTION OF EXAMPLE EMBODIMENTS

Figure 1:
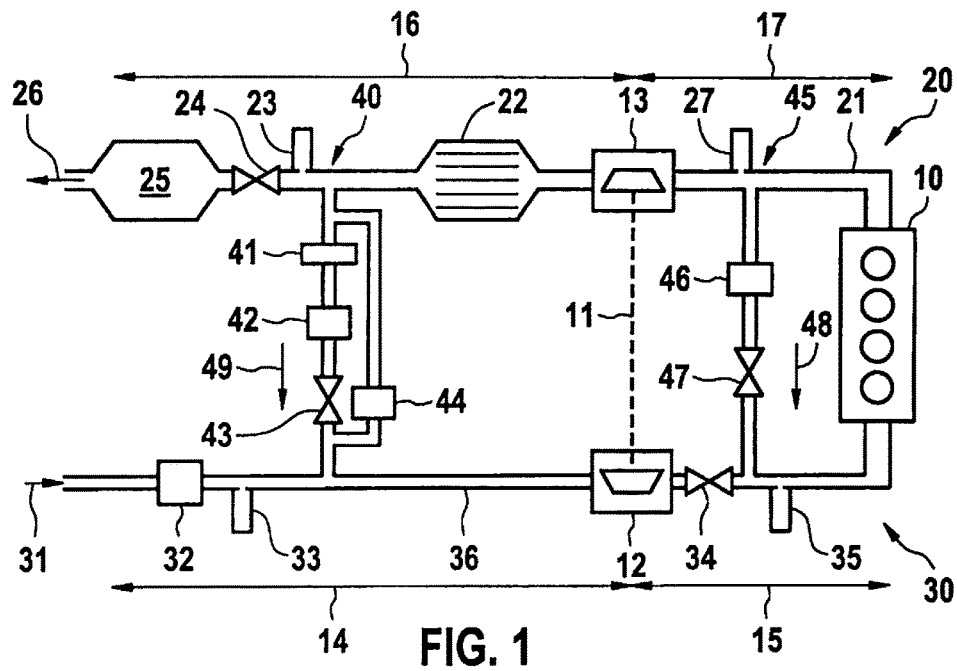
FIG. 1 shows a schematic view of the technical environment in which the method according to the present invention may be applied.

FIG. 1 shows a schematic view of the technical environment in which the method according to the present invention may be applied. An internal combustion engine 10 designed as a diesel engine having an air supply line 30 and an exhaust gas discharge line 20 is shown by way of example. The illustration is restricted to the parts needed for the description of the present invention. Fresh air 31 is supplied along a supply duct 36 of air supply line 30 via a hot-film air mass sensor 32, a compressor 12 of a turbocharger 11, and a fresh air throttle 34 to internal combustion engine 10. Air supply line 30 is divided into a supply air low-pressure area 14 upstream from compressor 12 and a supply air high-pressure area 15 in the flow direction downstream from compressor 12.

Exhaust gas 26 of internal combustion engine 10 is discharged via exhaust gas discharge line 20 from internal combustion engine 10 along an exhaust gas duct 21 via an exhaust gas turbine 13 of turbocharger 11, a particle filter 22, an exhaust flap 24, and a muffler 25 to the surroundings. Exhaust gas discharge line 20 is divided into an exhaust gas high-pressure area 17 and an exhaust gas low-pressure area 16, exhaust gas low-pressure area 16 beginning downstream from exhaust gas turbine 13 in the flow direction.

In the example shown, a low-pressure exhaust gas recirculation system 40 connects exhaust gas low-pressure area 16 downstream from particle filter 22 to supply air low-pressure area 14 downstream from hot-film air mass sensor 32. Low-pressure exhaust gas recirculation system 40 contains an exhaust gas filter 41, a first exhaust gas recirculation cooler 42, and a low-pressure exhaust gas recirculation valve 43 including a differential pressure sensor 44, via which a low-pressure exhaust gas recirculation mass flow 49 is guided. The pressure of exhaust gas 26 upstream from exhaust flap 24 is determined with the aid of a first pressure sensor 23 and is determined in the exhaust gas high-pressure area with the aid of a fourth pressure sensor 27. The pressure of fresh air 31 is determined with the aid of a second pressure sensor 33 upstream from fresh air throttle 34 and is determined with the aid of a third pressure sensor 35 downstream from the throttle. Pressure sensors 23, 27, 33, 35 may also be designed in another specific embodiment as modeled and converted back via a differential pressure sensor.

A high-pressure exhaust gas recirculation system 45 (EGR) connects exhaust gas high-pressure area 17 upstream from exhaust gas turbine 13 via a second exhaust gas recirculation cooler 46 and a high-pressure exhaust gas recirculation valve 47 to supply air high-pressure area 15 downstream from fresh air throttle 34, so that a high-pressure exhaust gas recirculation mass flow 48 may be recirculated.

During operation, the mass of fresh air 31 supplied to internal combustion engine 10 is determined using hot-film air mass sensor 32. A partial flow of exhaust gas 26 is admixed to fresh air 31 via low-pressure exhaust gas recirculation system 40. The air mixture thus resulting is compressed by compressor 12 of turbocharger 11, subsequently a further partial flow of exhaust gas 26 is admixed thereto via high-pressure exhaust gas recirculation system 45. The mixture thus resulting is supplied to internal combustion engine 10. Resulting exhaust gas 26 drives turbocharger 11 via exhaust gas turbine 13 and is depressurized to a lower pressure level. Subsequently, particles are filtered out of exhaust gas 26 using particle filter 22.

In the method according to the present invention, high-pressure exhaust gas recirculation mass flow 48 and/or low-pressure exhaust gas recirculation mass flow 49 is/are directly measured or derived indirectly from measured values. Thus, for example, high-pressure exhaust gas recirculation mass flow 48 may be determined from the measured values of air mass flow via throttle valve (fresh air throttle valve 34), speed, and inlet pressure (boost pressure), for example, in supply air high-pressure area 15. High-pressure exhaust gas recirculation mass flow 48 and/or low-pressure exhaust gas recirculation mass flow 49 is/are continued to be modeled.

Figure 2:
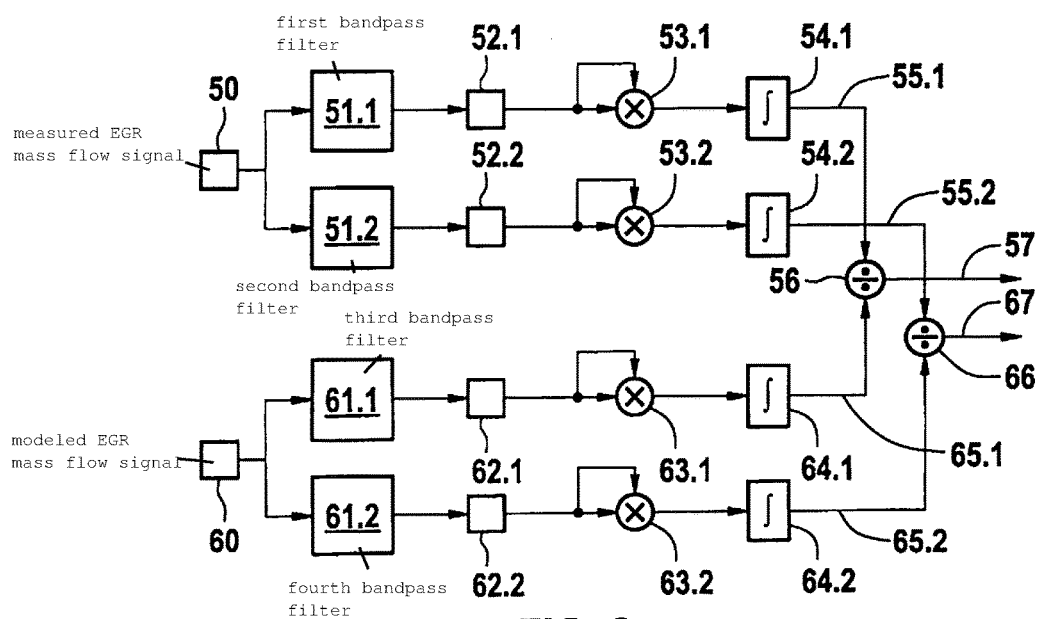
FIG. 2 shows a block diagram of a method for recognizing a dynamic error and a flow rate error.

FIG. 2 shows a block diagram of a method for recognizing a dynamic error and a flow rate error in low-pressure exhaust gas recirculation system 40 and/or high-pressure exhaust gas recirculation system 45 of internal combustion engine 10.

A measured EGR mass flow signal 50 is supplied to a first and a second bandpass filter 51.1, 51.2. A modeled EGR mass flow signal 60 is supplied to a third and a fourth bandpass filter 61.1, 61.2. First and third bandpass filters 51.1, 61.1 each have time constants, which are suitable for recognizing flow rate errors. The time constants of second and fourth bandpass filters 51.2, 61.2 are optimized for the recognition of dynamic errors. Flow rate errors are static EGR high/low-flow errors, while dynamic errors represent EGR slow response errors, as are described above in the possible causes thereof.

Thus, a measured EGR mass flow signal 52.1 filtered for flow rate errors, a measured EGR mass flow signal 52.2 filtered for dynamic errors, a modeled EGR mass flow signal 62.1 filtered for flow rate errors, and a modeled EGR mass flow signal 62.2 filtered for dynamic errors are obtained. Filtered EGR mass flow signals 52.1, 52.2, 62.1, 62.2 are each supplied to a squaring unit 53.1, 53.2, 63.1, 63.2 and subsequently to an integrating unit 54.1, 54.2, 64.1, 64.2. An energy $E_{meas,\ flow}$ 55.1 of measured EGR mass flow signal 52.1 filtered for flow rate errors, an energy $E_{meas,\ dyn}$ 55.2 of measured EGR mass flow signal 52.2 filtered for dynamic errors, an energy $E_{mod,\ flow}$ 65.1 of modeled EGR mass flow signal 62.1 filtered for flow rate errors, and an energy $E_{mod,\ dyn}$ 65.2 of modeled EGR mass flow signal 62.2 filtered for dynamic errors are thus obtained over an integration period of time. In a first divider 56, an energy quotient $r_{flow}$ 57 is determined as the ratio between energy $E_{meas, flow}$ 55.1 and energy $E_{mod, flow}$ 65.1. In a second divider 66, an energy quotient $r_{dyn}$ 57 is ascertained as the ratio between energy $E_{meas, dyn}$ 55.2 and energy $E_{mod, dyn}$ 65.1.

Figure 3:
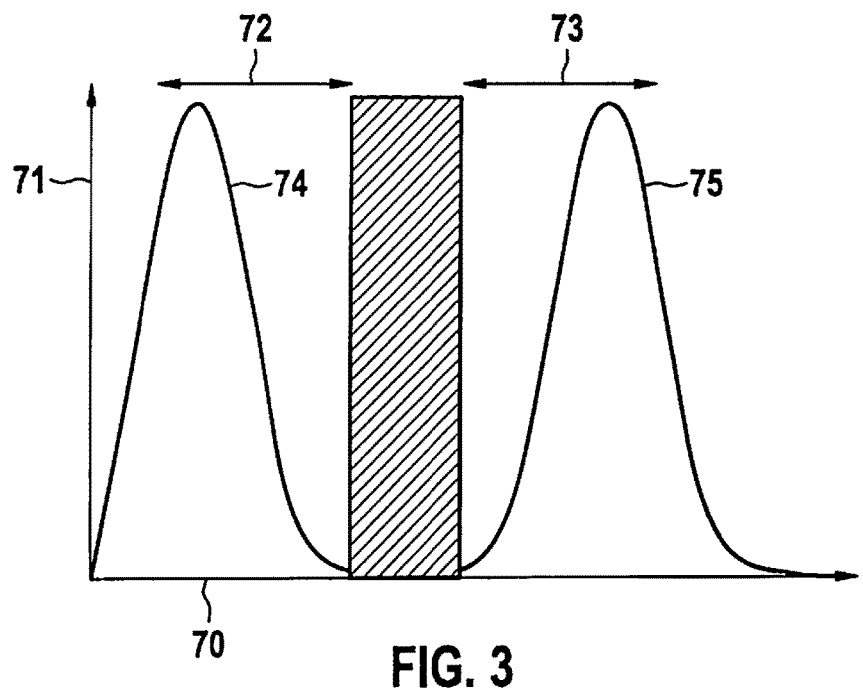
FIG. 3 shows a distribution diagram of diagnostic events.

FIG. 3 shows a distribution diagram of diagnostic events. To determine the distribution diagram, energy quotients r 57, 58 ascertained according to the block diagram shown in FIG. 2 are associated with particular energy quotient ranges, in the present case in steps of 0.1, and the frequency at which diagnostic events are associated with a particular energy quotient range is plotted in relation to an energy quotient axis 70 and a frequency axis 71. A flow error distribution 74 shows a typical distribution of determined energy quotients $r_{flow}$ 57, as is obtained in the event of a flow rate error, in the present case a low-flow error, for example, at a high-pressure exhaust gas recirculation system 45. A slow response error distribution 75 is obtained for energy quotients $r_{dyn}$ 67, if a dynamic error of exhaust gas recirculation system (40, 45) exists. As error distributions 74, 75 show, in the case of flow rate errors, statistically smaller energy quotients $r_{flow}$ 57 are obtained, and in the case of dynamic errors, statistically larger energy quotients $r_{dyn}$ 57 are obtained. Therefore, the individual flow rate errors (high-flow errors, low-flow errors) and the asymmetrical slow response errors may be recognized and differentiated from one another by an appropriate evaluation. A flow rate error is deduced if, for example, the statistical mean of energy quotients $r_{flow}$ 57 is in a flow rate error range 72. A dynamic error is recognized if the statistical mean of energy quotient $r_{dyn}$ 67 is within a dynamic error range 73.

Figure 4:
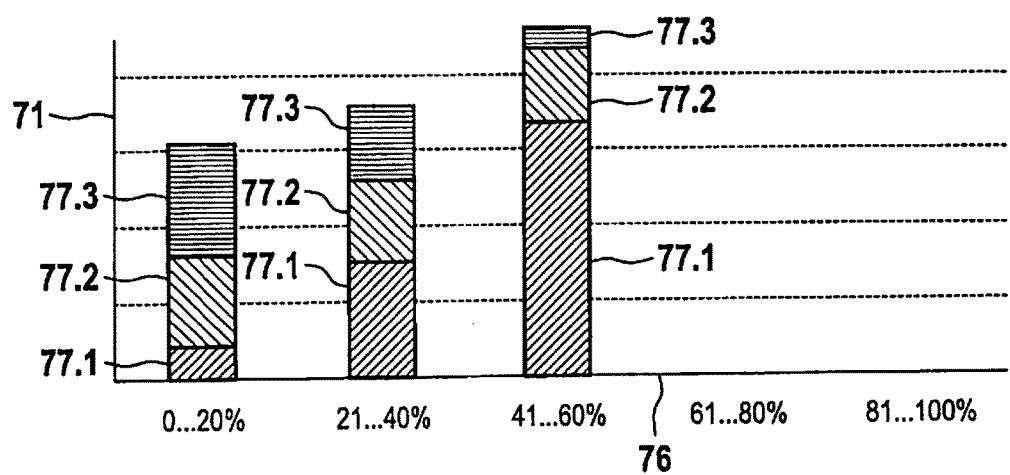
FIG. 4 shows a distribution of the number of diagnostic events, which are associated with various energy quotient ranges and EGR valve actuator position ranges.

FIG. 4 shows a distribution of the number of diagnostic events, which are associated with various energy quotient ranges 77.1, 77.2, 77.3 and EGR valve actuator position ranges 76. The distribution is accordingly plotted in relation to a frequency axis 71.

Figure 5:
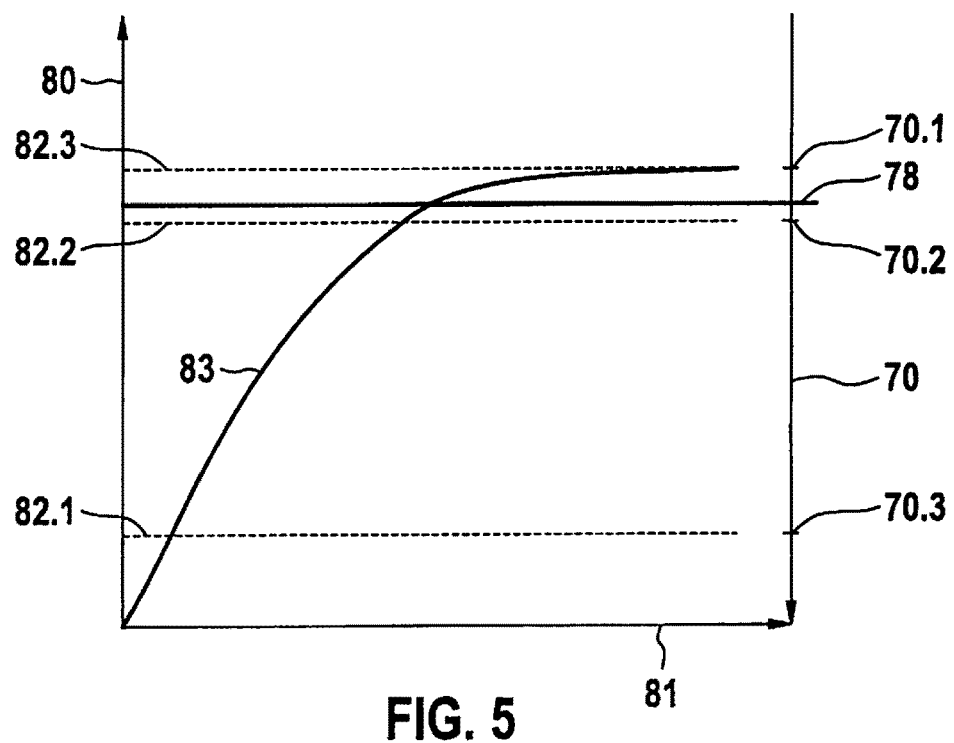
FIG. 5 shows a diagram of the evaluation of the error severity in the case of a low-flow error.

FIG. 5 shows a diagram for the evaluation of the error severity in the case of a low-flow error. For this purpose, a valve characteristic curve 83 is plotted in relation to an effective EGR valve area axis 80 and an EGR valve actuator position 81. A first effective EGR valve area $a_1$ 82.1, a second effective EGR valve area $a_2$ 82.2, and a third effective EGR valve area $a_3$ 82.3 are marked in relation to valve area axis 80. An energy quotient axis 70 forms a second ordinate. An energy quotient r=0 70.1, a first energy quotient threshold 70.2, and an energy quotient r=1 70.3 are marked along energy quotient axis 70. Valve characteristic curve 83 characterizes the effective area of an exhaust gas recirculation valve 43, 47 at various EGR valve actuator positions.

In the present case, EGR valve actuator position ranges 76 are divided into 20% steps of the maximum value in FIG. 4. In the exemplary embodiment shown, the focal point of the error distribution is in an EGR valve actuator position range 76 of 41% to 60%. A maximum of the diagnostic events was associated with first energy quotient range 77.1 within EGR valve actuator position range 76. First energy quotient range 77.1 includes in the present case energy quotients $r_{flow}$ 57 of 0.1-0.2 and is therefore below first energy quotient threshold 70.2 shown in FIG. 5. Transferred to the diagram shown in FIG. 5, this indicates that, for example, due to sooting, the effective EGR valve area in the range between second effective EGR valve area $a_2$ 82.2 and third effective EGR valve area $a_3$ 82.3, corresponding to an EGR valve actuator position of 60% to 100%, is no longer usable. This results in a lower exhaust gas recirculation rate than expected. It may be ascertained by emission tests whether such a reduction of the exhaust gas recirculation rate results in exceedance of the OBD emission limiting values. If this is the case, the diagnosis thus has to recognize a low-flow error as a flow rate error in the present case.

Figure 6:
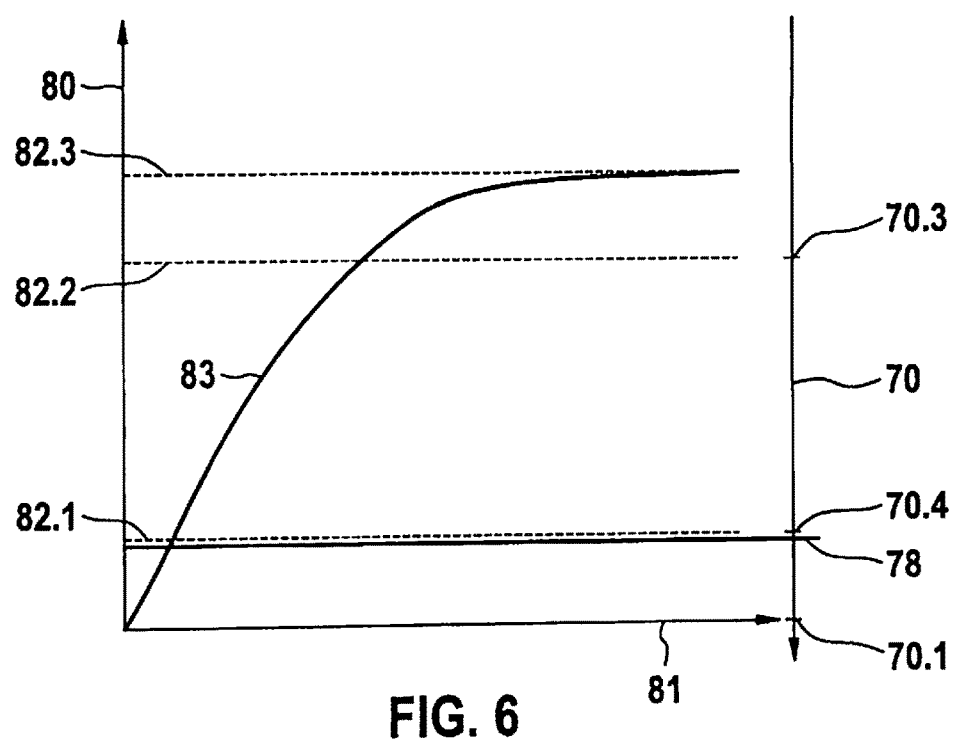
FIG. 6 shows the diagram shown in FIG. 5 for the evaluation of the error severity in the case of a high-flow error.

FIG. 6 shows the diagram shown in FIG. 5 for the evaluation of the error severity in the case of a high-flow error. The maximum of the diagnostic events is also associated here with an energy quotient range 77.1, 77.2, 77.3, which is below a second energy quotient threshold 70.4. Such an error case may occur, for example, if a leak occurs at the mixing point between an EGR mass flow and fresh air. This may again be associated with an effective EGR valve area, which in the present case is smaller than first effective EGR valve area $a_1$. The effective EGR valve area may be associated with an EGR valve actuator position $x_1$.

Below this EGR valve actuator position $x_1$, exhaust gas recirculation valve 43, 47 is no longer effectively usable. The EGR rate is elevated accordingly. Diagnostic events below EGR valve actuator position $x_1$ therefore result in low energy quotients r (57, 67). It may be ascertained by emission tests whether such an increase of the exhaust gas recirculation rate results in exceedance of the OBD emission limiting values.

What is claimed is:

1. A method for recognizing and differentiating a flow rate error and a dynamic error of an exhaust gas recirculation system (EGR) in an air charge system of an internal combustion engine, at least one of a high-pressure gas recirculation valve and a low-pressure gas recirculation valve being associated with the air charge system, the method comprising:
    measuring indirectly or directly, an EGR mass flow to provide a measured EGR mass flow signal;
    modeling the EGR mass flow to provide a modeled EGR mass flow signal;
    supplying each of the measured EGR mass flow signal and the modeled EGR mass flow signal to two respective bandpass filters, a first one of the bandpass filters having a time constant adapted for a recognition of flow rate errors, and a second one of the bandpass filtering having a time constant adapted for a recognition of dynamic errors;
    determining, for each of the measured EGR mass flow signal filtered for flow rate errors and dynamic errors, respectively, and for each of the modeled EGR mass flow signals filtered for flow rate errors and dynamic errors, respectively, an energy;
    forming a first energy quotient based on the energy of measured EGR mass flow signal filtered for flow rate errors and the energy of the modeled EGR mass flow signal filtered for flow rate errors;
    forming a second energy quotient based on the energy of the measured EGR mass flow signal filtered for dynamic errors and the energy of the modeled EGR mass flow signal filtered for dynamic errors;
    recognizing a flow rate error if the first energy quotient is in a predefined flow rate error range; and
    recognizing a dynamic error if the second energy quotient is in a predefined dynamic error range.

2. The method as recited in claim 1, wherein the first and second energy quotients are determined via a predefined number of diagnostic events and associated with energy quotient ranges, the flow rate error is deduced if the focal point of the distribution thus obtained of the energy quotients is in the predefined flow rate error range, and the dynamic error is deduced if the focal point of the distribution of the energy quotients is in the predefined dynamic error range.

3. The method as recited in claim 1, wherein the flow rate error range is at comparatively lower energy quotients and the dynamic error range is at comparatively higher energy quotients.

4. The method as recited in claim 1, wherein a scaling of the particular energy components is carried out.

5. The method as recited in claim 1, wherein, to determine each of the energies, the associated filtered EGR mass flow signal is squared and subsequently integrated, wherein one of: (i) the integration is carried out with the aid of an integration duration which is specific to signals, and (ii) a point in time for a start of the integration of the two signals being triggered both in the event of a rising signal flank of the output signal and in the event of a falling signal flank.

6. The method as recited in claim 1, wherein the determination of the energies and the formation of the energy quotients are restricted to at least one of positive and negative components of the filtered EGR mass flow signals.

7. The method as recited in claim 1, wherein one of a low-pressure exhaust gas recirculation mass flow via the low-pressure exhaust gas recirculation valve or a high-pressure exhaust gas recirculation mass flow via the high-pressure exhaust gas recirculation valve of the internal combustion engine is monitored, at least one of the low-pressure exhaust gas recirculation mass flow and the high-pressure exhaust gas recirculation mass flow being determined by modeling, on the one hand, and being directly measured or computed from measured values for an air mass flow in the supply air area of the internal combustion engine, from at least one of a speed of the internal combustion engine, and an inlet or boost pressure, on the other hand, and a function of at least one of the low-pressure exhaust gas recirculation valve and the high-pressure exhaust gas recirculation valve being monitored.

8. The method as recited in claim 1, wherein the first energy quotient and the second energy quotient are determined separately for two or more EGR valve position ranges of at least one of the low-pressure exhaust gas recirculation valve, and the high-pressure exhaust gas recirculation valve, the flow rate error being associated with a particular EGR valve position range of the at least one of the flow-pressure exhaust gas recirculation valve and the high-pressure exhaust gas recirculation valve if the first energy quotient is in a predefined flow rate error range, and the dynamic error being associated with a particular EGR valve position range if the second energy quotient is in a predefined dynamic error range.

9. A non-transitory computer-readable storage medium on which is stored a computer program product, which may be loaded directly into the internal memory of a digital computer and includes software code sections, the computer product, when executed by a computer, causing the computer to perform:
  receiving data from which a measured EGR mass flow signal can be determined;
  receiving data from which a modeled EGR mass flow signal can be determined;
  supplying each of the measured EGR mass flow signal and the modeled EGR mass flow signal to two respective bandpass filters, a first one of the bandpass filters having a time constant adapted for a recognition of flow rate errors, and a second one of the bandpass filtering having a time constant adapted for a recognition of dynamic errors;
  determining, for each of the measured EGR mass flow signal filtered for flow rate errors and dynamic errors, respectively, and for each of the modeled EGR mass flow signals filtered for flow rate errors and dynamic errors, respectively, an energy;
  forming a first energy quotient based on the energy of measured EGR mass flow signal filtered for flow rate errors and the energy of the modeled EGR mass flow signal filtered for flow rate errors;
  forming a second energy quotient based on the energy of the measured EGR mass flow signal filtered for dynamic errors and the energy of the modeled EGR mass flow signal filtered for dynamic errors;
  recognizing a flow rate error if the first energy quotient is in a predefined flow rate error range; and
  recognizing a dynamic error if the second energy quotient is in a predefined dynamic error range.

* * * * *